(12) United States Patent
Basra

(10) Patent No.: US 10,372,511 B2
(45) Date of Patent: Aug. 6, 2019

(54) METHOD AND APPARATUS FOR PROVIDING AN APPLICATION CONTROL TRIGGER

(71) Applicant: Verizon Patent and Licensing Inc., Arlington, VA (US)

(72) Inventor: Arvind K. Basra, Glen Ridge, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 221 days.

(21) Appl. No.: 14/335,036

(22) Filed: Jul. 18, 2014

(65) Prior Publication Data
US 2016/0019103 A1    Jan. 21, 2016

(51) Int. Cl.
| | | |
|---|---|---|
| *G06F 9/54* | (2006.01) | |
| *H04L 29/08* | (2006.01) | |
| *G06Q 10/06* | (2012.01) | |
| *H04W 4/06* | (2009.01) | |

(52) U.S. Cl.
CPC ............ *G06F 9/542* (2013.01); *G06Q 10/06* (2013.01); *H04L 67/10* (2013.01); *H04W 4/06* (2013.01)

(58) Field of Classification Search
CPC ......... H04L 67/10; H04L 67/16; H04L 63/20; H04L 41/0893; H04L 41/50; H04L 67/1097; H04L 41/5041; H04L 41/00; H04L 41/5096; H04L 67/02; H04L 67/306; H04L 12/4641; H04L 41/0213; H04L 41/28; G06F 9/542; H04W 4/06; G06Q 10/06
USPC ................................................ 709/223–245
See application file for complete search history.

(56) References Cited

U.S. PATENT DOCUMENTS

| | | | | |
|---|---|---|---|---|
| 2002/0065929 | A1* | 5/2002 | Kamentsky | H04L 29/06 709/231 |
| 2002/0087580 | A1* | 7/2002 | LaCroix | G06Q 30/0255 |
| 2003/0088433 | A1* | 5/2003 | Young | G06F 9/542 705/14.5 |
| 2004/0010793 | A1* | 1/2004 | Wallace | G06F 9/4443 719/318 |
| 2004/0057572 | A1* | 3/2004 | O'Connor | H04M 3/5233 379/266.01 |
| 2006/0126556 | A1* | 6/2006 | Jiang | H04L 12/18 370/328 |
| 2008/0040657 | A1* | 2/2008 | Kuznetsov | G06F 17/227 715/234 |
| 2008/0051076 | A1* | 2/2008 | O'Shaughnessy | G06F 21/305 455/419 |
| 2008/0141327 | A1* | 6/2008 | Oh | H04N 21/235 725/131 |
| 2010/0080163 | A1* | 4/2010 | Krishnamoorthi | H04L 12/189 370/312 |
| 2011/0044438 | A1* | 2/2011 | Wang | H04W 4/206 379/93.02 |

(Continued)

*Primary Examiner* — David R Lazaro
*Assistant Examiner* — Berhanu Shitayewoldetadik

(57) ABSTRACT

An approach for implementing a live application control platform for providing live application control triggers via a multicast/broadcast transmission session. The approach includes receiving an input for specifying an application event trigger. The approach also includes delivering the application event trigger over a multicast data channel, wherein the application event trigger is received by a device within a coverage area of the multicast data channel to trigger an event to be performed by one or more applications of the device.

20 Claims, 12 Drawing Sheets

(56) References Cited

U.S. PATENT DOCUMENTS

| | | | |
|---|---|---|---|
| 2011/0160998 A1* | 6/2011 | Rissanen | G01C 21/3438 |
| | | | 701/533 |
| 2014/0059116 A1* | 2/2014 | Oh | H04L 65/60 |
| | | | 709/203 |
| 2014/0155064 A1* | 6/2014 | Pandey | H04W 36/22 |
| | | | 455/436 |
| 2015/0098393 A1* | 4/2015 | Tofighbakhsh | H04W 24/02 |
| | | | 370/329 |

* cited by examiner

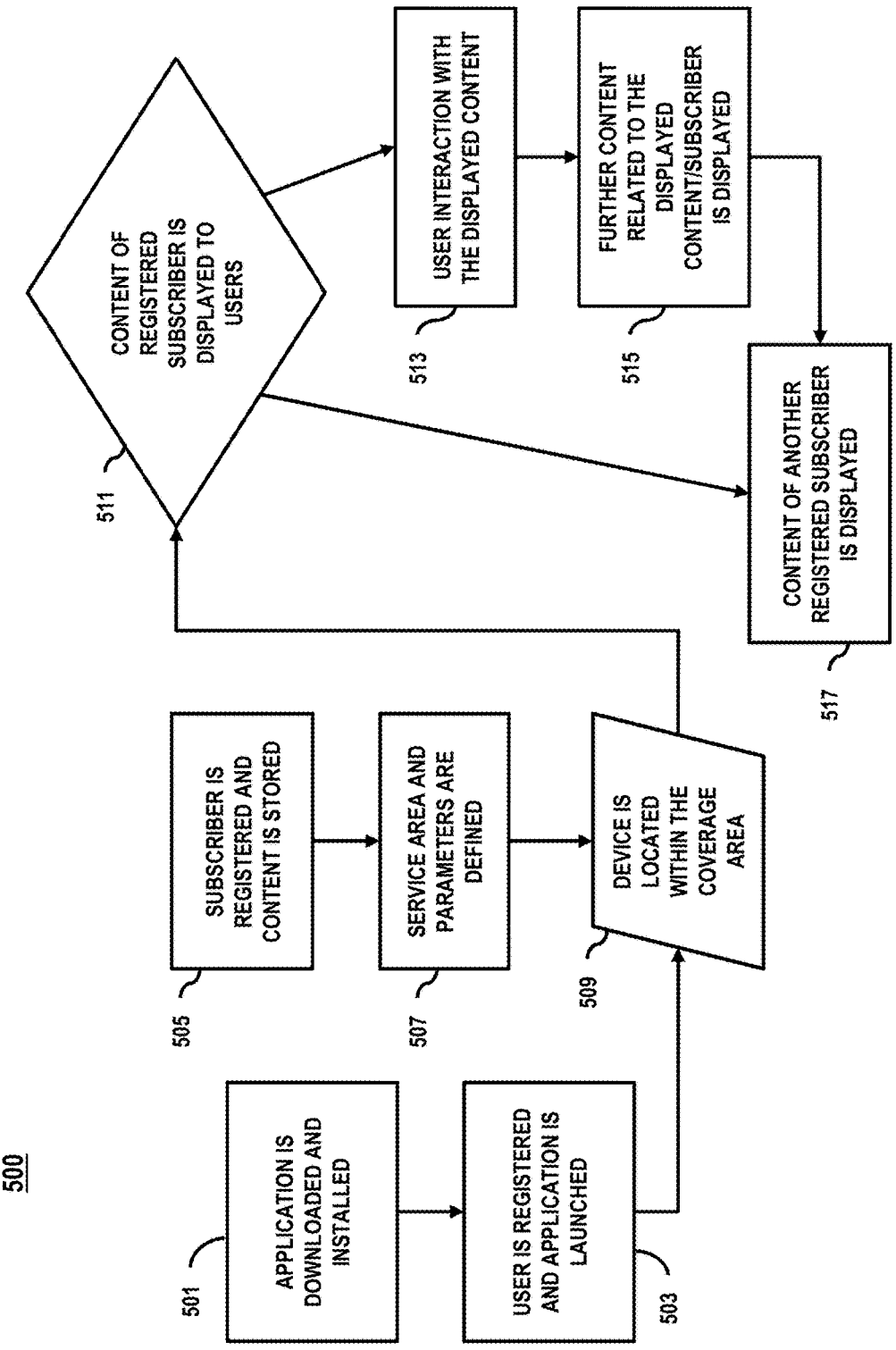

METHOD AND APPARATUS FOR PROVIDING AN APPLICATION CONTROL TRIGGER

BACKGROUND INFORMATION

With an increase in availability of various applications (e.g., for entertainment, services, contents, etc.) at a user device (e.g., a mobile phone, tablet, etc.), users may utilize any of the applications at any time or anywhere. For example, users may manually launch an application at a mobile device to access navigation services, multimedia streaming, online shopping, information about a point of interest (POI) or an event, or the like. In some instances, content or service providers may wish to initiate or control a multicast transmission of contents/services (contents or services) to a plurality of users in order to effectuate a better and more consistent experience among users that are located at or near a same location. For example, the provisioning of the contents (e.g., multimedia) may be based on a user location, user activity, time of day, an event, etc., so that the users may share the same experience and impact. Additionally, it may be advantageous to a network operator and its content providers if the operator could anticipate and organize the delivery of the contents to users in a given target area. In one scenario, content delivery in a cellular network may be via the evolved multimedia broadcast multicast service (eMBMS), which is the multicast standard for the Long Term Evolution (LTE) wireless communication standard. An eMBMS session allows for a point-to-multipoint service in which the same content may be transmitted from a single source to multiple recipients (e.g., user devices).

Based on the foregoing, there is a need for providing live application control via a multicast transmission of application event triggers.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3 through 5 are flowcharts of processes for providing live application control triggers via a multicast/broadcast transmission session, according to various embodiments;

DESCRIPTION OF THE PREFERRED EMBODIMENT

An apparatus, method and software for providing live application control triggers via a multicast/broadcast transmission session are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although various exemplary embodiments are described for providing live application control triggers via a multicast/broadcast transmission session, it is contemplated that these embodiments have applicability to a variety of processes and methods for delivery of event triggers to provide live control of applications at user devices in one or more target service areas, which may be identified by a network operator or a content/service provider.

Figure 1:
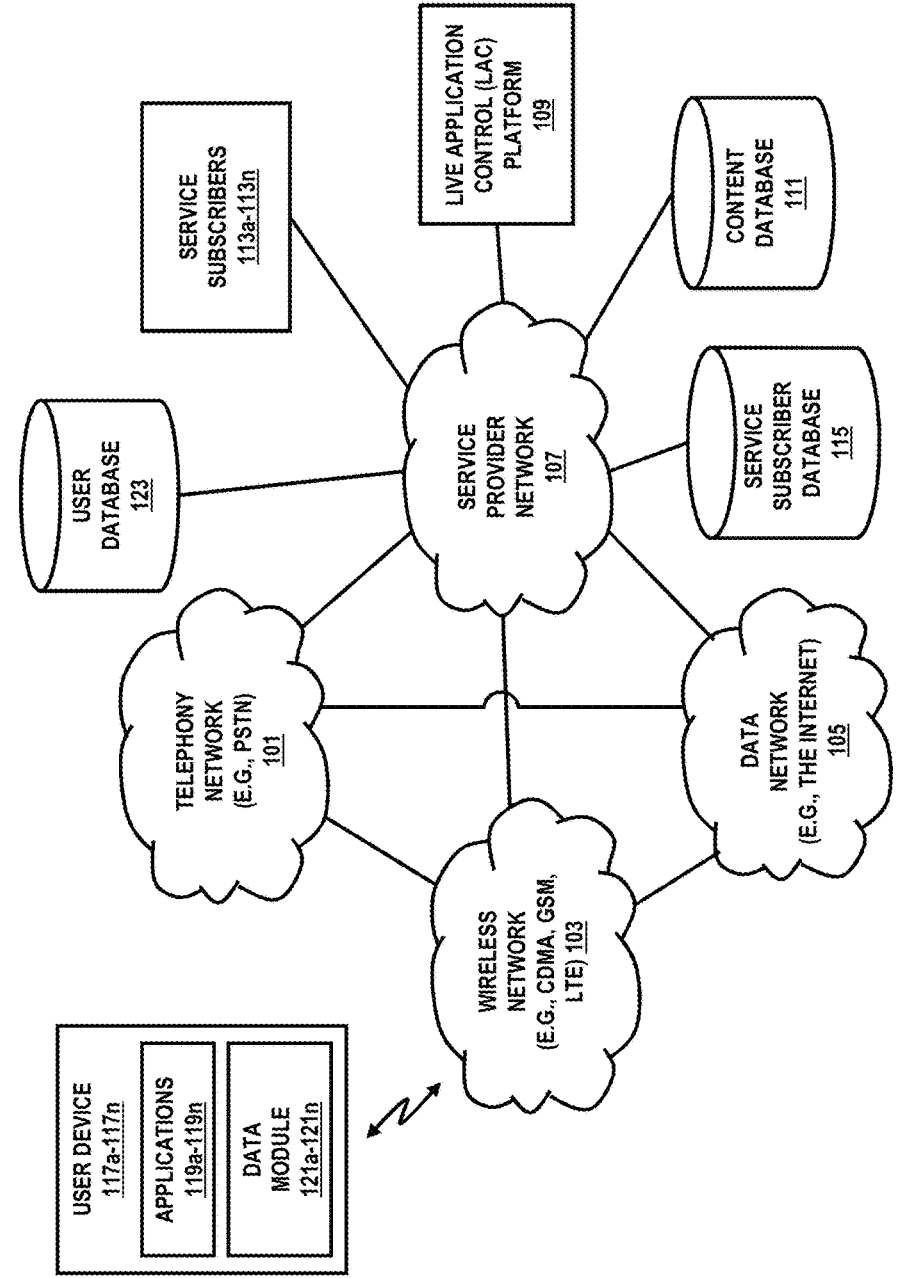
FIG. 1 is a diagram of a system capable of providing live application control triggers via a multicast/broadcast transmission session, according to one embodiment.

FIG. 1 is a diagram of a system for providing live application control triggers via a multicast/broadcast transmission session. Generally, applications at a user device may generate repetitive requests or interactions from a user of the user device in order to derive information gathering or application behavior; however, such interactions can also lead to a sudden increase in the communication network's traffic that adversely impact the network throughput. For example, a plurality of communications between a content provider and the user devices may be based on the user devices' location (e.g., near or at a certain POI) or an event (e.g., advertisements, coupons, etc.) relevant to the user devices' location. Additionally, a plurality of users located in the same network service area may utilize one or more applications at their of user devices to request for a same content (e.g., a live or pre-recorded streaming of a music concert), where a content provider may cause a unicast (e.g., one-to-one) delivery/transmission of the same content item to each user device. However, such user or application behavior of user devices that are within the same service are may not provide for a consistent user experience or network efficiency. Therefore, there is a need to provide live application control triggers via a multicast/broadcast transmission session.

To address these issues, system 100 of FIG. 1 enables the capability to provide live application control triggers via a multicast/broadcast transmission session. In one scenario, live application control can be leveraged to give content and application providers the opportunity to control the behavior of their applications at a large number of user devices in a given geographic service area. Such control may provide for a consistent controlled engagement of the users with the applications or their contents while safe guarding the associated communication network against traffic storms. In one example, during a holiday season, it is common for many retailers to sponsor holiday themed marketing events over a large geographic area, where they may provide custom applications to engage customers/users to special sales or rebates relative to a nearest store and time of day, wherein a communication from a content/application provider may trigger multimedia alerts at the user devices. In another example, a large number of customers may attend theme parks, sports arenas, or the like venues where a proprietor may wish to communicate various relevant contents (e.g., multimedia) to its customers. For instance, as users are at or near the venue, applications at the user devices can be triggered to present contents already available in the application or to request/access content relevant to the venue so that the users may remain interested, up-to-date, or potentially may take advantage of promotions or incentives that may be offered by a provider associated with the venue. In one example, communication of the application controls to the user devices may be via an eMBMS session for network efficiency.

In one embodiment, a provider (e.g., a merchant, an event organizer, etc.) may request for a service provider to broadcast one or more application controls (event triggers) to a plurality of user devices that may be within a target service area. For example, an application-X associated with a provider-X may be broadcast to the user devices located within a target service area. In various scenarios, the application-X may be downloaded by a user of the user device or may be pre-loaded by a service provider or a manufacturer of the user device. In one scenario, an application event trigger-X may be broadcast to the plurality of user devices that are within a given target service area, wherein the trigger-X may cause the application-X to trigger events or actions that are described in the trigger-X. In various scenarios, an application event trigger may include metadata that is pertinent to a target application's behavior attributes; for example, trigger time, duration, repetition, or the like.

For the purpose of illustration, the system 100 may include one or more networks, including a telephony network 101, a wireless network 103, a data network 105, a service provider network 107. By way of example, the networks 101, 103, 105, and 107 may be any suitable wireline and/or wireless network, which may be managed by one or more service providers. In one example, the networks 101, 103, 105, and 107 may be one or more elements in the system 100, which may include various components and elements for providing a range of communication and network services. For example, telephony network 101 may include a circuit-switched network, such as the public switched telephone network (PSTN), an integrated services digital network (ISDN), a private branch exchange (PBX), or other like network. Wireless network 103 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 101, 103, 105, and 107 may be completely or partially contained within one another, or may embody one or more of the aforementioned infrastructures. For instance, the service provider network 115 may embody circuit-switched and/or packet-switched networks that include facilities to provide for transport of circuit-switched and/or packet-based communications. It is further contemplated that networks 101, 103, 105, and 107 may include components and facilities to provide for signaling and/or bearer communications between the various components or facilities of system 100. In this manner, networks 101, 103, 105, and 107 may embody or include portions of a signaling system 7 (SS7) network, or other suitable infrastructure to support control and signaling functions.

Moreover, the system 100 may include a live application control platform 109 (LAC platform), which may be a standalone component or may be implemented in one or more elements of the system 100, for example, in the service provider network 107. The LAC platform may have access to content database 111, which may include various content or applications that may be provided by one or more content or service providers; for example, multimedia files, event information, coupons, advertisements, news updates, sports reports, or the like that may be available from their respective producers, owners, distributors, publishers, or the like.

Additionally, the system 100 may include service subscribers 113a-113n (service subscriber) that may include a retailer, an event organizer, a POI proprietor, or the like, which may utilize one or more services of the system 100. In one embodiment, a LAC platform may perform one or more tasks for controlling distribution, initialization, presentation, interaction, or the like functions associated with contents or applications at a user device 117. In one scenario, the LAC platform may perform one or more tasks based on one or more configuration parameters associated with a service subscriber, where the parameters may be available via a service subscriber database 115 (subscriber database) or directly from a service subscriber. In one embodiment, the subscriber database may be maintained or updated by a service subscriber associated with the subscriber database, the service provider network 107, the LAC platform, or by any element of the system 100 that may be authorized to do so.

Further, the system 100 may include one or more user devices 117a-117n (user device), which may include, execute, and utilize one or more applications 119a-119n (applications) and one or more data modules 121a-121n (data module). Additionally, the system 100 may include a user database 123 that may include information about a user or a user device; for example, user history, user device type and capabilities, user preferences, user profile, or the like.

By way of examples, the user devices 117 may communicate with other user devices via one or more proximity-based communication channels or via one or more network service providers in the system 100. Further, the applications 119 may include various applications associated with productivity, education, entertainment, social networking, web browsing, communications, content sharing, multimedia consumption, user interface (UI), map application, web client, or the like.

In one embodiment, a user device 117 may utilize a data module 121 for determining/collecting data or content associated with the user device 117, user device location, one or more users of the user device 117, the applications 119, one or more content items (e.g., multimedia content), and the like. In addition, the user device 117 can execute an application 119 that is a software client for storing, processing, and/or forwarding one or more information items to other components of the system 100. In various embodiments, the data module 121 may include various sensors for detecting and capturing various signals, information, and contents, for example, audio, video, location information, Bluetooth signals, near field communication (NFC) signals, wireless local area network (WLAN) signals, RFID signals, or the like. Further, the collected information, content, or signals may be shared, via the applications 119 with other user devices 117, the LAC platform, or with other entities of the system 100.

It is noted that user devices 117 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone, set-top box, TV set, or any combination thereof. It is also contemplated that the user devices can support any type of interface for supporting the presentment or exchanging of data. In addition, user devices may facilitate various input means for receiving and generating information, including touch screen capability, keyboard and keypad data entry, voice-based input mechanisms and the like. Any known and future implementations of user devices are applicable. In certain embodiments, user devices may be configured to establish peer-to-peer communication sessions with each other using a variety of technologies, including near field communication (NFC), Bluetooth, ZigBee, infrared, etc. Also, connectivity can be provided via a wireless local area network (LAN). By way of example, a group of user devices 117 may be configured to a common LAN so that each device can be uniquely identified via any suitable network addressing scheme.

Figure 2:
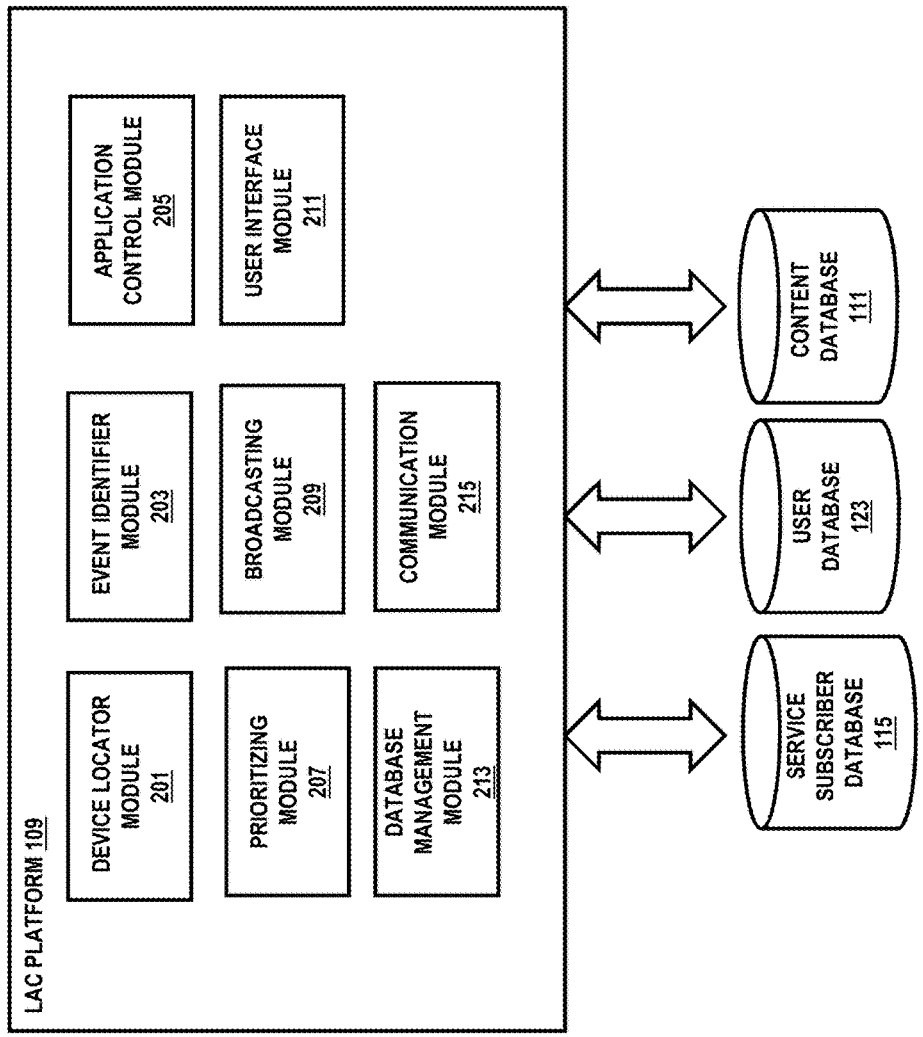
FIG. 2 is a diagram of the components of a live application control platform, according to one embodiment.

FIG. 2 is a diagram of the elements of a LAC platform, according to one embodiment. In various scenarios, the LAC platform may be implemented as part of a service provider network 107, a content provider, or the like. The LAC platform may include various executable modules for performing one or more computing, data processing, or network based instructions that in combination provide a means for providing live application control triggers via a multicast/broadcast transmission session. Such modules may be implemented in hardware, firmware, software, or a combination thereof. By way of example, the LAC platform may include a device locator module 201, event identifier module 203, application control module 205, prioritizing module 207, broadcasting module 209, user interface module 211, database management module 213, and a communication module 215, wherein each module may include various components or elements for performing various tasks associated with the LAC platform. In addition to the content database 111, the subscriber database 115, or the user database 123, the LAC platform may have access to local or remote storage devices for storing various data, configuration parameters, contents, or the like.

In one embodiment, the device locator module 201 may utilize information associated with a user device that may be available from the user device or from one or more elements of the system 100. In one example, the location of a user device may be determined directly from location information provided by the applications 119 or the data module 121. In one scenario, location of the user device may be determined from information available from the wireless network 103, for example, information asked to which communication tower of the wireless network 103 the user device may be in communication with.

In various scenarios, the event identifier module 203 may utilize information available from a service subscriber or from one or more public or private databases in order to determine one or more events that may be relevant to a user, location of a user/user device, a target service area associated with the service provider network, or the like. For example, information from a local news database may be utilized to determine that a music concert is available within a target service area where a user device is located. In one example, a service subscriber may identify one or more events that the service subscriber may be sponsoring or co-sponsoring with another service subscriber or proprietor at a POI.

In one embodiment, the application control module 205 may utilize information from one or more service subscribers to generate one or more application event triggers to trigger one or more applications at one or more user devices. In one scenario, a service subscriber may be a retailer, an event (e.g., sports, music, educational, etc.) organizer, an advertising company, a service provider, or the like. Further, the application event triggers may be based on user location, user activity, user preferences, user history, user device configuration, or the like. In one embodiment, the application event triggers specify the event, content associated with the event, an application behavioral attribute, or the like parameters. In one embodiment, the application behavioral attribute includes an event trigger time, an event duration, an event repetition, or a combination thereof. In one scenario, the application control module may encode an event trigger in one or more encoding schemes, for example, in an extensible markup language (XML), where an application at a user device can receive and decode the encoded event trigger so to perform one or more instructions therein.

In one embodiment, the prioritizing module 207 may interact with a service subscriber or a network operator to determine a schedule/priority for delivery of one or more application event triggers to the user devices. In one example, the priority to deliver application event trigger maybe based on parameters provided by the service subscriber associated with the application event trigger. In one scenario, the priority maybe based on a comparison of a plurality of application event triggers, where a certain event trigger may need to be delivered to the users prior to a delivery of remaining event triggers. For example, an event trigger that may need to prepare or initialize certain parameters of a target application at a user device may need to be delivered to that user device before other event triggers are delivered to that user device. In one embodiment, a priority may be based on a service agreement between a LAC platform and a service subscriber. In one scenario, a priority may be based on a network traffic associated with a service provider.

In one embodiment, the broadcasting module 209 may communicate the application event triggers and their respective priorities to a communication network provider for broadcasting to a plurality of user devices within a target service area, wherein the broadcasting may be via an eMBMS session. In one scenario, the broadcasting module may request for the network provider to prebuild a multicast data channel with available event triggers related to an event, a target service area, a service subscriber, or the like so that the event triggers would be ready for delivery to the user devices in the target service area.

In one embodiment, the user interface module 211 may utilize information associated with a user device and its capabilities for presenting contents via a UI element at the user device. In one scenario, the UI information may be determined from the user database 123, which may include information about one or more devices that may be registered to a user. In one embodiment, parameters for presenting contents at a UI of a user device may be included into application control trigger that is communicated to the user device.

In one embodiment, the database management module 213 may interact with one or more local or remote databases for performing one or more tasks associated with managing contents at a database. In various scenarios, the database management module may interact with a service subscriber, a content provider, a service provider, or the like for requesting or receiving contents that may be associated with an entity thereof.

In one embodiment, the communication module 215 may be utilized to communicate with various components of the system 100 or with the modules of the LAC platform. In one embodiment, the communication module 215 may utilize one or more communication channels to communicate the information available from one or modules of the LAC platform to one or more entities in the system 100. For example, an application event trigger may be communicated to the service provider network 107, or information from the user database 123 may be requested and received via the communication module. By way of example, the communication module 215 may execute various protocols and data sharing techniques for enabling collaborative execution of commands or sharing of information among the various elements of the system 100.

Figure 3:
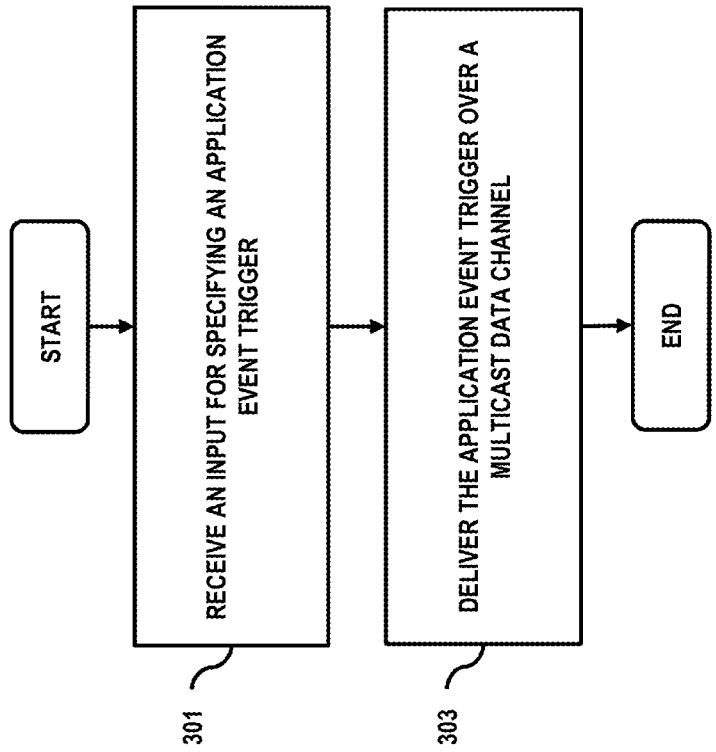
Figure 4:
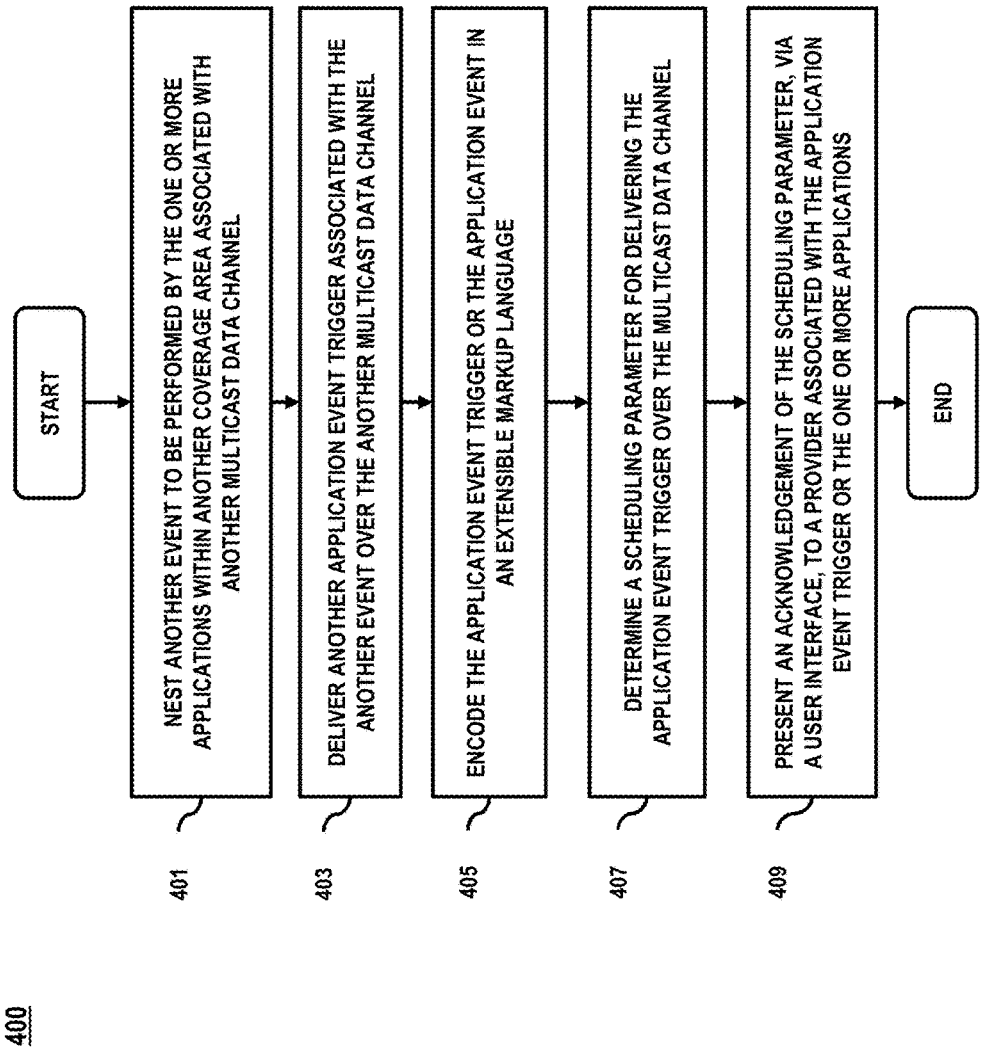

FIGS. 3 through 5 are flowcharts of processes for providing live application control triggers via a multicast/broadcast transmission session, according to various embodiments. It is noted that the steps of processes 300, 400, and 500 may be performed in any suitable order and by any of the components of the system 100, as well as combined or separated in any suitable manner. Further, for clarity in discussing the processes 300, 400, and 500, the LAC platform is referred to as completing various steps of said processes; however, said processes and/or example steps described therein may be performed in any suitable order, wherein one or more of the steps may be optional.

As shown in FIG. 3, in step 301, a LAC platform may receive an input for specifying an application event trigger. In one embodiment, the LAC platform may receive one or more inputs (e.g., requests) from one or more service subscribers that may wish to trigger one or more applications at one or more user devices. For example, a content provider may submit a request to the LAC platform to cause a transmission of one or more application event triggers to control functionalities of one or more application at one or more user devices. In one scenario, a service subscriber may be a retailer, an event (e.g., sports, music, educational, etc.) organizer, an advertising company, a service provider, or the like. In one example, the input may include parameters to specify delivery order of the event triggers, target service areas, or the like. Further, the input may be based on user location, user activity, user preferences, user history, user device configuration, or the like. In one embodiment, the application event trigger specifies the event, content associated with the event, an application behavioral attribute, or a combination thereof. In one embodiment, the application behavioral attribute includes an event trigger time, an event duration, an event repetition, or a combination thereof.

In step 303, the LAC platform may deliver the application event trigger over a multicast data channel, wherein the application event trigger is received by a device within a coverage area of the multicast data channel to trigger an event to be performed by one or more applications of the device. In one scenario, an event trigger may cause one or more applications at a user device to perform one or more tasks, wherein the tasks may be to present information, contents, coupons, promotional material, or the like. In one embodiment, one or more applications at the user device may cause a request for contents, information, search, application download, services, or the like, wherein the LAC platform may route the request to one or more service subscribers. In one scenario, the event trigger may cause an activation of an application or contents that may already be available at the user device. For example, a user device may include a coupon offering by a service subscriber, where only a specific event trigger may cause the presentation of that coupon at the user device. In one embodiment, the LAC platform may cause or request for a network service provider (e.g., a cellular network operator) to configure one or more multicast data channels for the delivery of application event trigger via one or more multicast transmissions to the user devices in one or more target service areas. In one embodiment, a multicast data channel is an eMBMS channel. In one embodiment, a multicast data channel may be scaled/reconfigured according to changes in the network traffic associated with a given service area. In one embodiment, the application event trigger may be received, performed, blocked, or a combination thereof by the device based on a user profile, a user preference, or a combination thereof. In various scenarios, a user device may be associated with a user profile or user preferences, which may indicate as to how an event trigger is to be handled by one or more applications or modules at the user device. For instance, a user profile may indicate that only certain types of event triggers associated with certain providers may be executed at the user's device. In one example, a user may wish to allow performance or presentation of information, updates, promotional material, or the like that are associated with sporting events or organizers.

Referring to FIG. 4, in step 401, the LAC platform may nest another event to be performed by the one or more applications within another coverage area associated with another multicast data channel, wherein the another coverage area is contained at least partially within the coverage area. In one scenario, a first event trigger received at a user device via a first multicast channel may include a second event trigger, which may include configuration or execution parameters indicating that the second event trigger will trigger one or more events at the user device only when the location of the user device is determined to be at or near a second target service area associated with a second multicast channel. For example, the second event trigger may cause a presentation of a different content item, service, or application when the user device location is determined to be near the second target service area. In one scenario, a first target service area may include, at least partially, the second target service area. For example, a user attending an event (e.g., a sporting event) in a target service area "A" may be directed to go to a certain POI (e.g., a sporting goods store), which may be partially located within the target service area "A" and a target service area "B".

In step 403, the LAC platform may deliver another application event trigger associated with the another event over the another multicast data channel. In one embodiment, the LAC may cause a service provider to utilize a second multicast channel, which may be associated with a second target service area, and deliver the second event trigger to a user device. In one scenario, the user device may be associated with a first and a second target service area and a first and a second multicast transmission channel.

In step 405, the LAC platform may encode the application event trigger, the application event, or a combination thereof in an extensible markup language. In one scenario, the LAC platform may encode an event trigger in one or more encoding schemes, for example, in an extensible markup language (XML), where one or more applications at a user device can receive and decode the encoded event trigger. In one example, an encoded event trigger may include information or instructions for accessing one or more content items, executing one or more software program routines, one or more other applications at the user device, access a local or remote website associated with a content or service provider, or the like.

In step 407, the LAC platform may determine a scheduling parameter for delivering the application event trigger over the multicast data channel. In one scenario, the LAC platform may determine scheduling information for creating one or more eMBMS sessions to deliver one or more event triggers based on priority level associated with a service subscriber associated with an application event trigger that is to be delivered to user devices in one or more target service areas. In one embodiment, the scheduling parameter may be based on specific times, user device location (e.g., a geo-fence), relevance of an event trigger with a POI or a content item associated with the user or the user device, or the like.

In step 409, the LAC platform may present an acknowledgement of the scheduling parameter, via a user interface, to a provider associated with the application event trigger, the one or more applications, or a combination thereof. In one embodiment, a LAC platform may present to a service subscriber, a content provider, a service provider, or to other elements of the system 100 an acknowledgement of a delivery schedule associated with an event trigger. In one scenario, a plurality of acknowledgments for a plurality of event triggers may be presented to the same service subscriber that is associated with the plurality of event triggers. For example, a service subscriber may be associated with three event triggers that are to be scheduled and delivered according to a predetermined schedule. In one embodiment, the acknowledgment may be presented via a communication interface at the LAC platform.

FIG. 5 illustrates an example process for providing live application event triggers via a multicast/broadcast transmission session. In one scenario, process 500 may begin at step 501 where the LAC platform may determine location of the user device is at a certain target service area and may initiate downloading of one or more applications that may be associated with one or more service subscribers. In one example, the applications may already be available at the user device, e.g., from a previous interaction, preloaded at the user device, or the like. In step 503, the user and the user device may be registered with the LAC platform and a communication session may be established with the user device where one or more applications are launched. In one embodiment, at step 505, the service subscriber may register with one or more LAC platforms and provide various content items or information, which may be stored at one or more local or remote storage devices associated with the LAC platform. Further, at step 507, the subscriber may define one or more target service areas and associated service parameters that may be used by a LAC platform to generate and control provisioning of application event triggers to the user devices. In one scenario, at step 509, the LAC platform determines if a user device is within a target service area, which, for example, may be determined from location information received from the user device or a service provider (e.g., communication services) associated with the user device. In one embodiment, the target service area may be determined from the service parameters associated with the service subscriber. For example, a target service area may be based on a predefined geographical area, a relative distance between a user device and a POI, proximity of the user device to a given event, or the like. Once the user device is determined to be within a target service area, at step 511, the LAC platform may cause a delivery of the one or more event triggers to the user device, wherein one or more applications at the user device may perform one or more tasks identified in the one or more event triggers. For example, an application at the user device may present a content item associated with a merchant at a nearby location. At step 513, a user of the user device may interact with the contents or information that are displayed at the user device, where the user may request for additional contents/information related to the contents, services, or the service subscriber associated therewith. At step 515, the LAC platform may access and provide additional contents, which may include contents as requested by the user as well as contents that the LAC platform or the subscriber may determine to be potentially relevant or of interest to the user. For example, the user may request for additional content or information associated with a music concert, wherein the LAC platform may provide a promotional offer (e.g., coupon) for multimedia contents that may be available via the subscriber. In one scenario, at step 517, the LAC platform may determine and present at the user device other relevant contents that may be available from other service subscribers. For example, presentation of contents about a Christmas musical play by a first service subscriber at a certain concert hall may be followed by a presentation of promotional offers associated with one or more service subscribers for holiday dining, holiday shopping, Christmas multimedia contents, or the like that may be available at one or more POIs near the concert hall. In one scenario, the user device may receive the first content transmitted via a first eMBMS channel and the second content via a second eMBMS channel.

FIGS. 6A through 6D illustrate user interface examples that may be utilized in the processes of FIGS. 3 through 5, according to various embodiments.

Figure 6A:
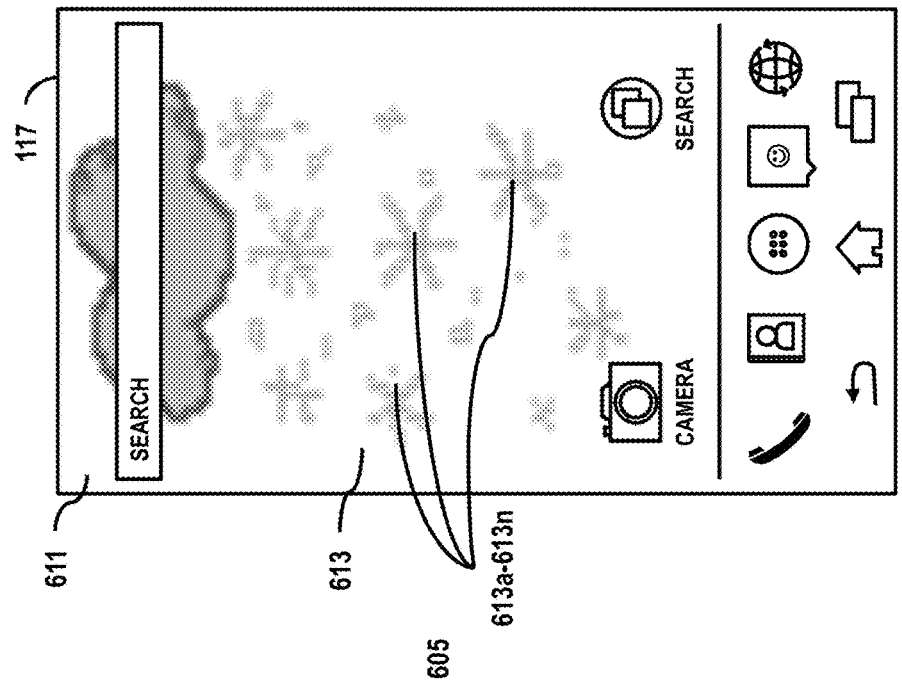
FIGS. 6A through 6D illustrate user interface examples that may be utilized in the processes of FIGS. 3 through 5, according to various embodiments.

FIG. 6A illustrates UI 601 at a user device 117 which may present one or more content items associated with a service subscriber. In one embodiment, as a user with the device 117 enters a POI, e.g., a theme park, a proprietor of the theme park (e.g., also a service subscriber to a LAC platform) may utilize the services of a LAC platform to interact with the user device 117 and control one or more applications 119 thereon. For example, to trigger a presentation of a welcome message 603, a multimedia item 605, or an animated character 607 that may further cause a presentation of one or more content items 609 (e.g., a promotional offer). In one embodiment, an event trigger from the LAC platform may cause an application at the user device 117 to utilize its user's profile information to further customize the contents presented at the user device 117. For example, the welcome message 603 may include the user's name, or the contents 607 and 609 may be customized according to the user's age, an accompanying companion (e.g., family member, friend, etc. in a travel itinerary), user's interests (e.g., shows, food, shopping, etc.), or the like.

Figure 6B:
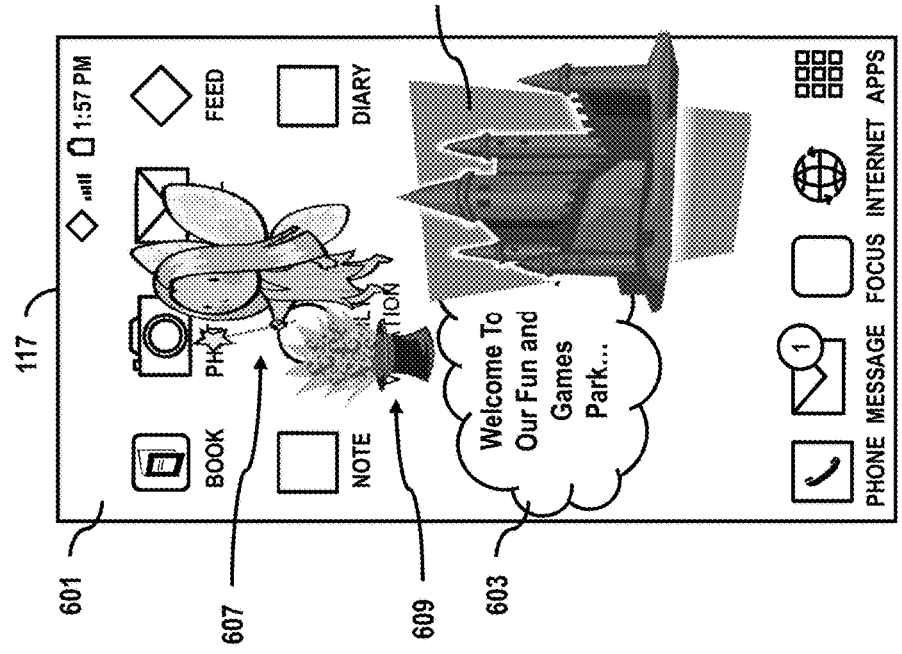

FIG. 6B illustrates example UI 611 at a user device 117 where a proprietor/sponsor of a POI (e.g., a retail store) at a given city center (e.g., New York City) may wish to sponsor a "Winter Wonderland" seasonal theme event. In one scenario, as users congregate at or near the POI to witness the event, the LAC platform may cause a transmission of an event trigger, via an eMBMS channel, so that content 613, an animated falling of snowflakes, may be displayed at the user devices that are near or at the POI. In one embodiment, users may interact with presented content items, e.g., falling snowflakes 613a-613n, to view additional information or offers (e.g., coupons) that may be embedded in each instance of the content items.

Figure 6C:
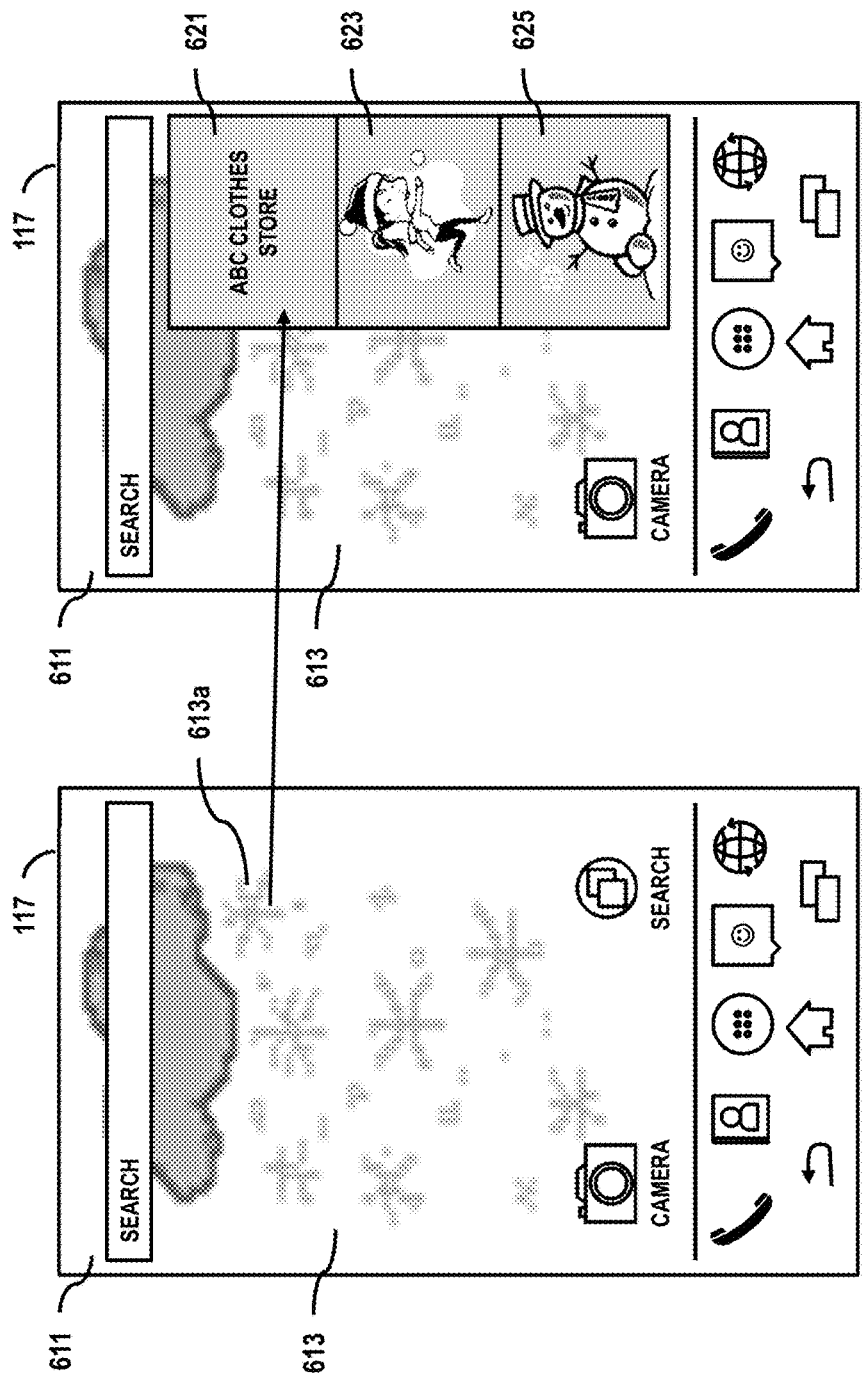

FIG. 6C illustrates the UI 611 at the user device 117 where a user may interact with a content item, snow flake 613*a*, to view additional information therein. In one example, an interaction with the snow flake 613*a* may cause a presentation of information 621 that is associated with a certain merchant, wherein an interaction with the information 621 may provide additional information or contents (e.g., a coupon for the merchant store). In various scenarios, an event trigger may cause presentation of additional contents or options at the user device, e.g., present gaming or entertainment opportunities, so that a user may continue to interact with the presented contents. For example, the user of a user device 117*a* may be prompted/invited to "throw a virtual snowball" 623 at one or more other nearby user devices 117*b*-117*m*, wherein if the user does throw the virtual snowball, then the LAC platform may transmit an event trigger or information to the user devices 117*b*-117*m* so an application thereon may trigger a presentation of a virtual snowball at those user devices. In another example, users at the POI may be invited to build a virtual snowman 625, wherein the LAC platform may facilitate and update a progress of that activity.

Figure 6D:
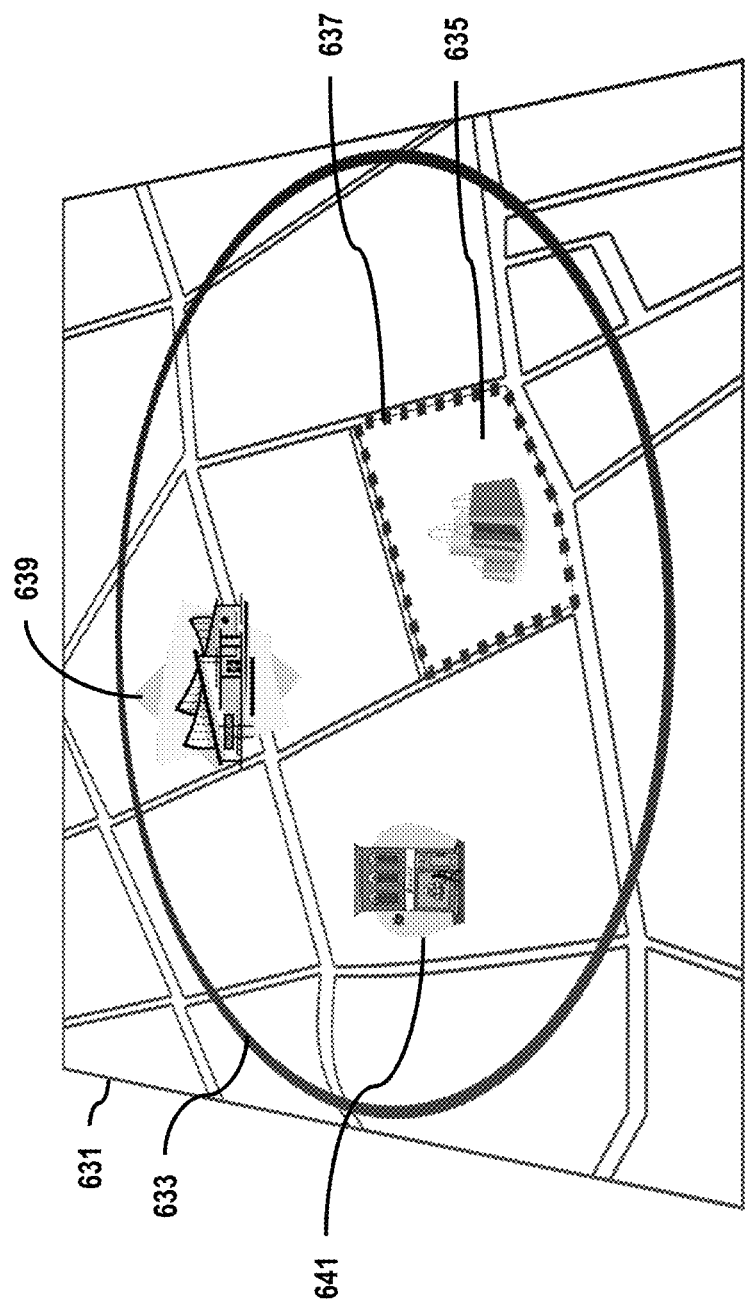

In one example of FIG. 6D, an event trigger may trigger an application to present a map view 631 at a user device 117, wherein the LAC platform or one or more service subscribers may have identified a target service area 633. In one scenario, a user device 117 may be at the POI 635 (e.g., a store), where the LAC platform may utilize a localized eMBMS channel 637 to trigger and control presentation of contents associated with the POI 635. For example, the local broadcast may provide information about products, services, offers, etc. that are available at the POI 635. In one embodiment, the LAC platform may utilize a macro eMBMS channel to broadcast event triggers associated with one or more other POIs, 639 or 641, which are located within the target service area 633. In one scenario, broadcast of the event triggers may be co-sponsored by one or more service subscribers associated with the POIs 635, 639, or 641.

Figure 7:
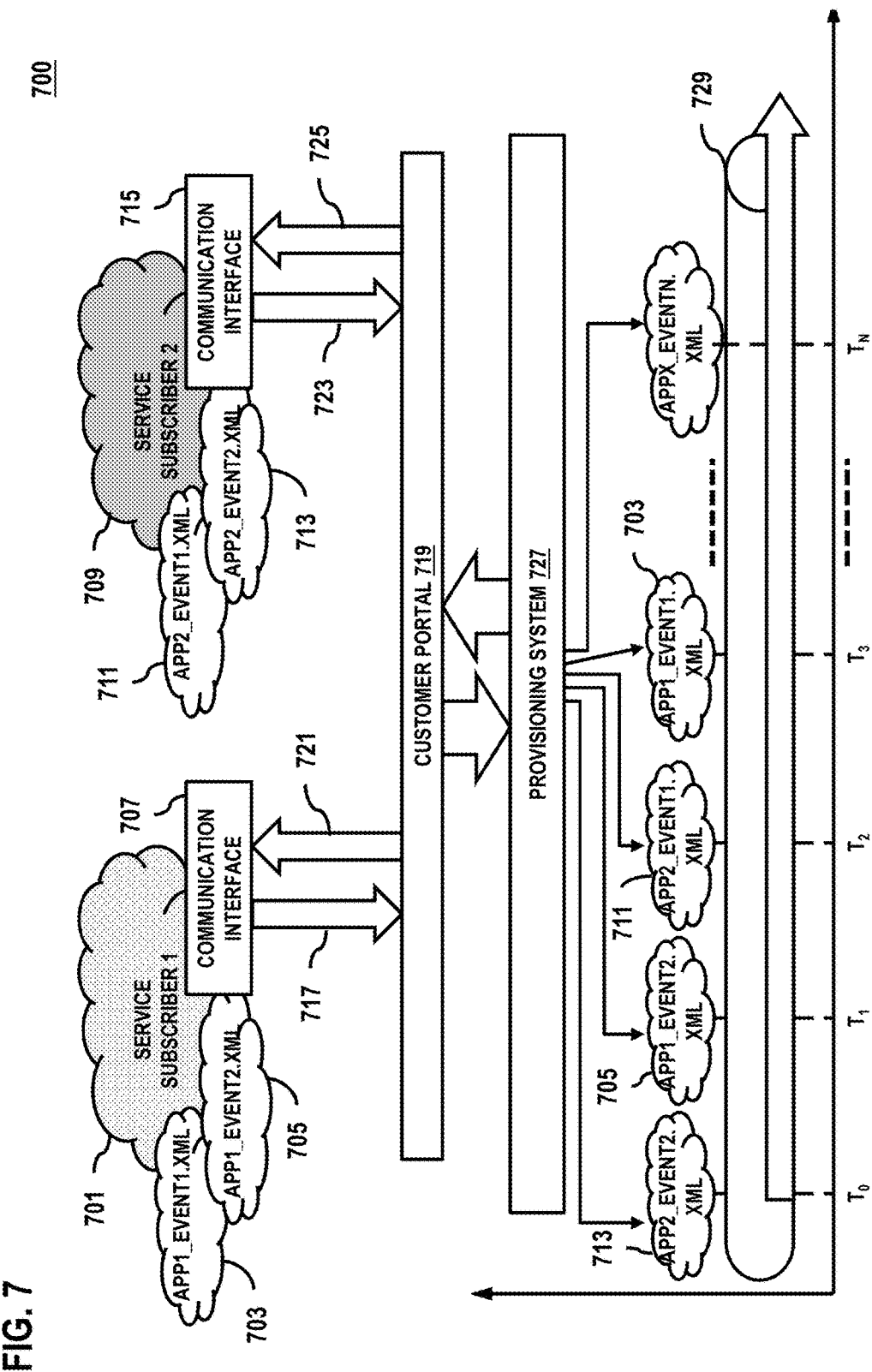
FIG. 7 illustrates interactions between a service subscriber and a service provider to determine and deliver live application control triggers to user devices, according to various embodiments.

FIG. 7 illustrates interactions between a service subscriber and a service provider to determine and deliver live application control triggers to user devices, according to various embodiments. In diagram 700, a LAC platform may interact with one or more elements of the system 100 to schedule provisioning of event triggers via one or more eMBMS channels. As noted, a LAC platform can facilitate delivery of application event triggers to a plurality of user devices in one or more target service areas. In one scenario, the diagram 700 includes "service-subscriber-1" 701 (subscriber-1), which is a sponsor for "application-1 event trigger-1" 703 (app1-event1) and "application-1 event trigger-2" (app1-event2) 705, where the subscriber-1 and the LAC platform may communicate via a communication interface 707, which may be a web-based interface, application programming interface (API), or the like. Additionally, the diagram 700 includes "service-subscriber-2" 709 (subscriber-2), which is the sponsor for "application-2 event trigger-1" 711 (app2-event1) and "application-2 event trigger-2" 713 (app2-event2), wherein the subscriber-2 and the LAC platform may communicate via a communication interface 715. In various embodiments, the communication interfaces 707 and 715 may be dedicated to their respective entities or may be a shared interface between a service subscriber and a LAC platform. In one example, the subscriber-1 communicates, via signaling 717, parameters for scheduling of the app1-event1 and app1-event2 to a customer portal 719 at the LAC platform and receives an acknowledgment of the scheduling via the signaling 721. In one example, the scheduling may include a specific time (e.g., T1 and T3) for the delivery of each of the event triggers, target service areas, contents associated with the event triggers, or the like. Similarly, the subscriber-2 communicates, via signaling 723, scheduling of the app2-event1 and app2-event2 to a customer portal 719 at the LAC platform and receives an acknowledgment of the scheduling via the signaling 725. In one embodiment, the customer portal 719 may communicate the event triggers to a provisioning system 727, which may determine a schedule for delivering the event triggers or any related contents to the user devices via one or more eMBMS sessions. In various embodiments, the provisioning system 727 may schedule delivery of the event triggers or contents based on specific times requested by their respective sponsors (e.g., service subscribers), a prioritized schedule based on a type of events/contents, a first-come-first-served mechanism, network traffic, or the like. In the example, the app-events 713, 705, 711, and 703 are scheduled respectively for delivery at T0, T1, T2, and T3 via an eMBMS channel 729 that may be prebuilt, remain active, or be reserved dynamically as needed. In various scenarios, the provisioning system 727 may present one or more scheduling options to the service subscribers, for example, where a service subscriber may wish/agree to pay a fee to prioritize the delivery of one or more event triggers or associated content items.

Figure 8:
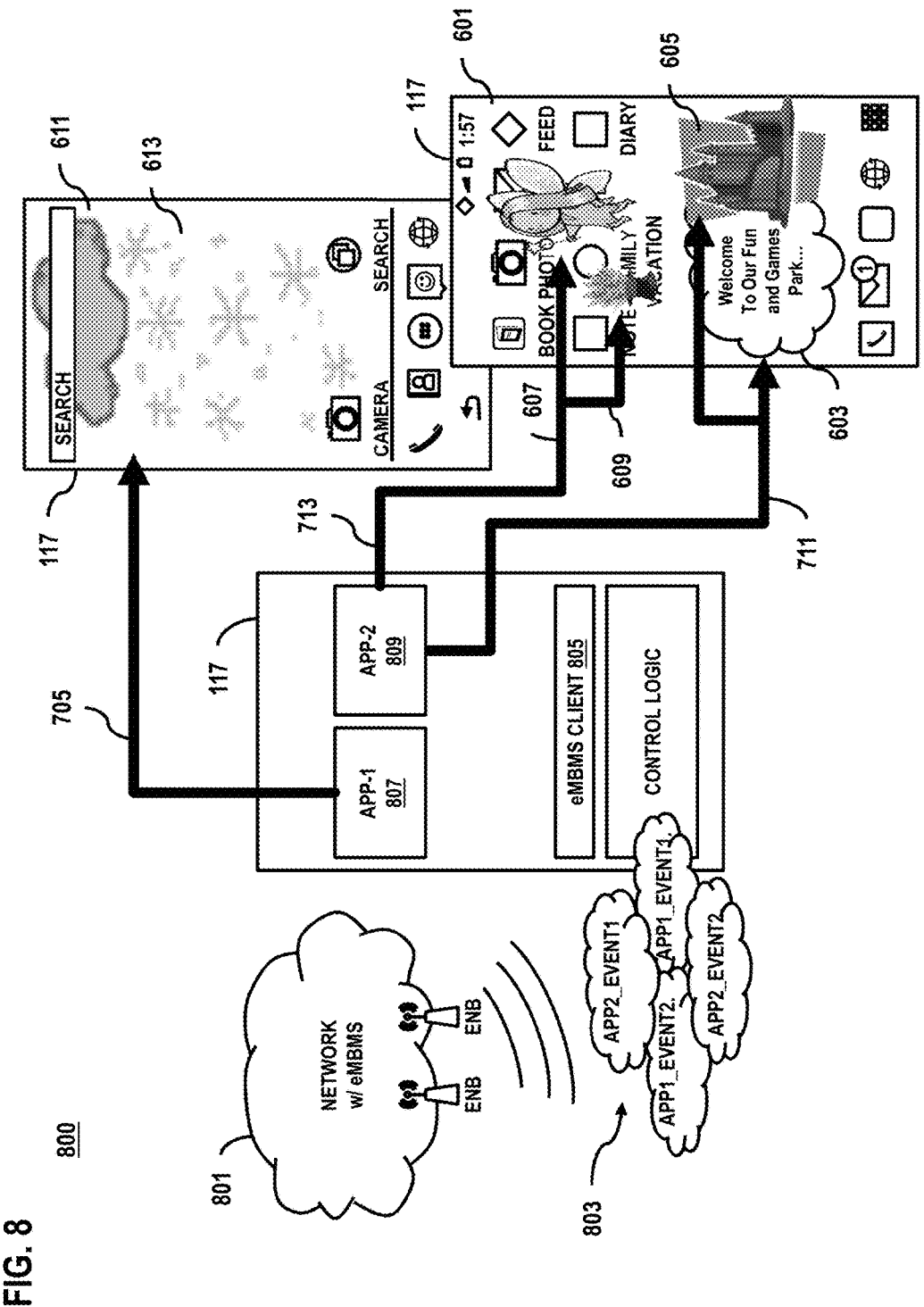
FIG. 8 illustrates an interaction process to deliver live application control triggers to user devices, according to one embodiment.

FIG. 8 illustrates an interaction process to deliver LAC triggers to user devices, according to one embodiment. In one embodiment, a LAC platform may cause a communication network provider 801 to broadcast event triggers 803 via an eMBMS channel to a user device 117, where various modules (e.g., a control logic) or an eMBMS client 805 may process the event triggers to determine the event triggers associated with each APP-1, 807, and APP-2, 809. In one scenario, APP-1-event2 trigger, 705, may cause presentation of the animated snowflakes 613 at the UI 611. In one scenario, APP-2-event2 trigger, 713, may cause presentation of the animated character 607 at the UI 601, which may include a nested event trigger to cause a presentation of the content item 609 as well. Further, the APP2-event1, 711, may cause a presentation of content items 603 and 605 at the UI 601.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The exemplary techniques and systems presented herein enables providing live application control triggers via a multicast/broadcast transmission session. As an advantage, a LAC platform may be utilized to communicate with one or more service subscribers for determining service parameters and preferences to generate one or more application event triggers. Further, the LAC platform may facilitate scheduling and communication of the triggers to a plurality of user devices in one or more target service areas, where in the delivery may be via one or more eMBMS communication channels.

The processes described herein for providing live application control triggers via a multicast/broadcast transmission session may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
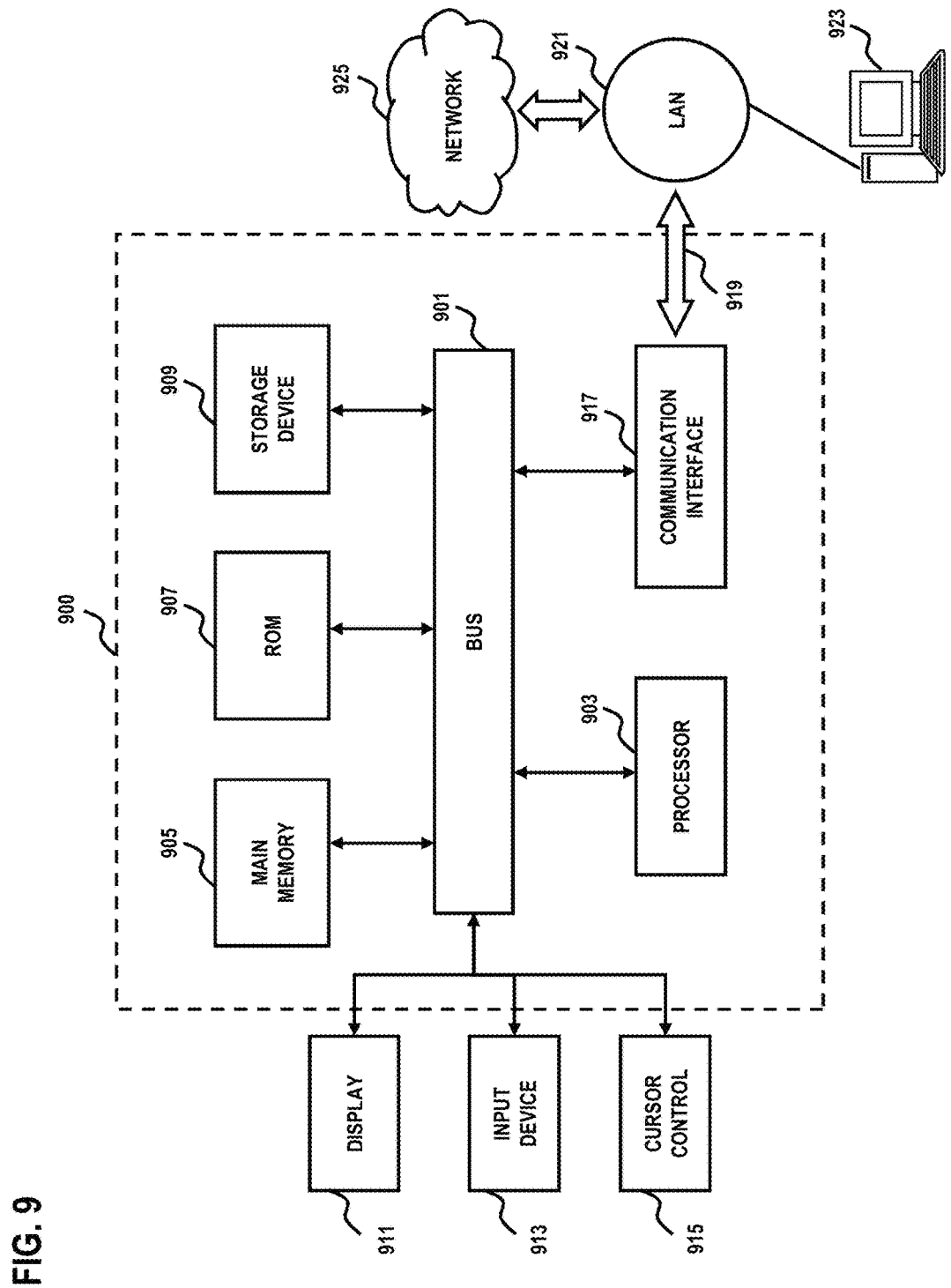
FIG. 9 is a diagram of a computer system that can be used to implement various embodiments.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multiprocessing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
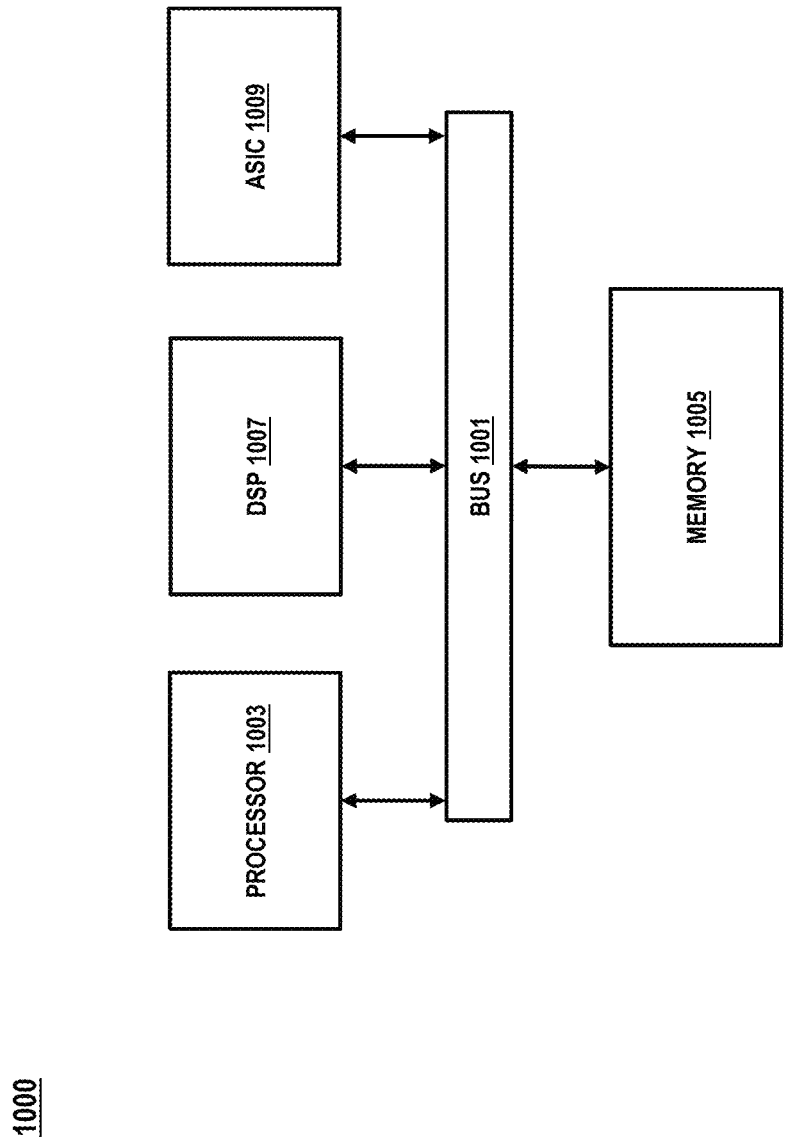
FIG. 10 is a diagram of a chip set that can be used to implement an embodiment of the invention.

FIG. 10 illustrates a chip set 1000 upon which an embodiment of the invention may be implemented. Chip set 1000 is programmed for providing live application control triggers via a multicast/broadcast transmission session and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 3-5.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method, implemented by one or more computing devices, comprising:
   receiving, by the one or more computing devices, an input that specifies an application event trigger that specifies:
      an action that a particular application, installed at a user mobile device that receives the application event trigger, is to perform,
      a specified time at which the particular application, installed at the user mobile device, that receives the application event trigger, is to perform the action specified by the application event trigger, and
      an indication of one or more types of information, specific to the user mobile device, that are to supplement the action specified in the application event trigger;
   broadcasting content over a multicast data channel delivered via a cellular network, to a plurality of user mobile devices that are within a coverage area of the multicast data channel; and
   broadcasting the application event trigger over the multicast data channel, wherein broadcasting the application event trigger causes the plurality of user mobile devices to perform the action specified in the application event trigger, the performing including:
      determining one or more items of information, specific to the user mobile device, that respectively correspond to the one or more types of information specified by the application event trigger,
      supplementing the broadcasted content with the determined one or more items of information, and
      presenting, at the specified time, the supplemented broadcasted content, including the determined one or more items of information.

2. The method of claim 1, wherein the application event trigger specifies an application behavioral attribute of the application.

3. The method of claim 1, wherein the input specifying the application event trigger additionally includes an event duration, an event repetition indication, or a combination thereof.

4. The method of claim 1, further comprising:
   determining a second application event trigger associated with another coverage area associated with another multicast data channel, wherein the another coverage area is contained at least partially within the coverage area; and
   delivering the second application event trigger over the another multicast data channel, wherein reception of the second application event trigger, by the plurality of user mobile devices, causes the plurality of user mobile devices to perform a second action, specified by the second application event trigger, when the plurality of user mobile devices enter the another coverage area.

5. The method of claim 1, further comprising:
   encoding the application event trigger in an extensible markup language.

6. The method of claim 1, further comprising:
   determining a scheduling parameter for delivering the application event trigger over the multicast data channel, wherein broadcasting the application event trigger includes broadcasting the application event trigger in accordance with the scheduling parameter.

7. The method of claim 6, further comprising:
presenting an acknowledgement of the scheduling parameter, via a user interface, to a provider associated with the application event trigger.

8. The method of claim 1, wherein the application event trigger is broadcasted to a particular user mobile device, wherein the particular user mobile device forgoes performing the action based on a user profile associated with the particular user mobile device.

9. An apparatus comprising:
a non-transitory computer-readable medium containing program instructions; and
one or more processors to execute the program instructions to:
receive an input that specifies an application event trigger that specifies:
an action that a particular application, installed at a user mobile device that receives the application event trigger, is to perform,
a specified time at which the particular application, installed at the user mobile device, that receives the application event trigger, is to perform the action specified by the application event trigger, and
an indication of one or more types of information, specific to the user mobile device, that are to supplement the action specified in the application event trigger;
broadcast content over a multicast data channel delivered via a cellular network, to a plurality of user mobile devices that are within a coverage area of the multicast data channel; and
broadcast the application event trigger over the multicast data channel, wherein broadcasting the application event trigger causes the plurality of user mobile devices to perform the action specified in the application event trigger, the performing including:
determining one or more items of information, specific to the user mobile device, that respectively correspond to the one or more types of information specified by the application event trigger,
supplementing the broadcasted content with the determined one or more items of information, and
presenting, at the specified time, the supplemented broadcasted content, including the determined one or more items of information.

10. The apparatus of claim 9, wherein the application event trigger specifies an application behavioral attribute of the application.

11. The apparatus of claim 9, wherein the input specifying the application event trigger additionally includes an event duration, an event repetition indication, or a combination thereof.

12. The apparatus of claim 9, wherein the processor is further configured to:
determine a second application event trigger associated with another coverage area associated with another multicast data channel, wherein the another coverage area is contained at least partially within the coverage area; and
deliver the second application event trigger over the another multicast data channel, wherein reception of the second application event trigger, by the plurality of user mobile devices, causes the plurality of user mobile devices to perform a second action, specified by the second application event trigger, when the plurality of user mobile devices enter the another coverage area.

13. The apparatus of claim 9, wherein the processor is further configured to:
encode the application event trigger in an extensible markup language.

14. The apparatus of claim 9, wherein the processor is further configured to:
determine a scheduling parameter for delivering the application event trigger over the multicast data channel, wherein broadcasting the application event trigger includes broadcasting the application event trigger in accordance with the scheduling parameter.

15. The apparatus of claim 14, wherein the processor is further configured to:
present an acknowledgement of the scheduling parameter, via a user interface, to a provider associated with the application event trigger.

16. The apparatus of claim 9, wherein the application event trigger is broadcasted to a particular user mobile device, wherein the particular user mobile device forgoes performing the action based on a user profile associated with the particular user mobile device.

17. A non-transitory computer-readable medium including instructions, for execution by one or more processors, to control the one or more processors to:
receive an input that specifies an application event trigger that specifies:
an action that a particular application, installed at a user mobile device that receives the application event trigger, is to perform,
a specified time at which the particular application, installed at the user mobile device, that receives the application event trigger, is to perform the action specified by the application event trigger, and
an indication of one or more types of information, specific to the user mobile device, that are to supplement the action specified in the application event trigger;
broadcast content over a multicast data channel delivered via a cellular network, to a plurality of user mobile devices that are within a coverage area of the multicast data channel; and
broadcast the application event trigger over the multicast data channel, wherein broadcasting the application event trigger causes the plurality of user mobile devices to perform the action specified in the application event trigger, the performing including:
determining one or more items of information, specific to the user mobile device, that respectively correspond to the one or more types of information specified by the application event trigger,
supplementing the broadcasted content with the determined one or more items of information, and
presenting, at the specified time, the supplemented broadcasted content, including the determined one or more items of information.

18. The non-transitory computer-readable medium of claim 17, wherein the instructions further control the one or more processors to:
determine a second application event trigger associated with another coverage area associated with another multicast data channel, wherein the another coverage area is contained at least partially within the coverage area; and
deliver the second application event trigger over the another multicast data channel, wherein reception of the second application event trigger, by the plurality of user mobile devices, causes the plurality of user mobile devices to perform a second action, specified by the second application event trigger, when the plurality of user mobile devices enter the another coverage area.

19. The non-transitory computer-readable medium of claim 17, wherein the instructions further control the one or more processors to:

encode the application event trigger in an extensible markup language.

20. The non-transitory computer-readable medium of claim 17, wherein the instructions further control the one or more processors to:

determine a scheduling parameter for delivering the application event trigger over the multicast data channel, wherein broadcasting the application event trigger includes broadcasting the application event trigger in accordance with the scheduling parameter.

* * * * *